United States Patent
Im

(10) Patent No.: US 9,269,518 B2
(45) Date of Patent: Feb. 23, 2016

(54) ELECTRIC CHARGING APPARATUS AND FAILURE DETERMINATION METHOD THEREFOR

(71) Applicant: LSIS CO., LTD., Anyang-si, Gyeonggi-do (KR)

(72) Inventor: Chang Jun Im, Asan-si (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 157 days.

(21) Appl. No.: 14/248,187

(22) Filed: Apr. 8, 2014

(65) Prior Publication Data
US 2014/0334056 A1 Nov. 13, 2014

(30) Foreign Application Priority Data

May 13, 2013 (KR) .......................... 10-2013-0053862

(51) Int. Cl.
*H01H 47/00* (2006.01)
*B60L 3/00* (2006.01)
*B60L 11/18* (2006.01)

(52) U.S. Cl.
CPC .............. *H01H 47/002* (2013.01); *B60L 3/003* (2013.01); *B60L 3/0023* (2013.01); *B60L 11/1816* (2013.01); *B60L 2240/20* (2013.01); *Y02T 10/7005* (2013.01); *Y02T 90/14* (2013.01)

(58) Field of Classification Search
CPC . H01H 47/002; B60L 3/0023; H60L 11/1816
See application file for complete search history.

(56) References Cited

U.S. PATENT DOCUMENTS

| 5,008,516 | A | * | 4/1991 | Holling .......................... 219/519 |
| 5,629,864 | A | | 5/1997 | Noe et al. |
| 6,412,677 | B1 | * | 7/2002 | Yoshikuni et al. ................. 225/2 |

FOREIGN PATENT DOCUMENTS

| CN | 101286646 | 10/2008 |
| JP | 01-232628 | 9/1989 |
| JP | 6-70137 | 9/1994 |
| JP | 2008-312380 | 12/2008 |
| JP | 2010-161009 | 7/2010 |
| JP | 3166788 | 3/2011 |
| JP | 2011-103230 | 5/2011 |
| JP | 2013-257969 | 12/2013 |

OTHER PUBLICATIONS

Japan Patent Office Application Serial No. 2014-087844, Office Action dated May 12, 2015, 3 pages.
The State Intellectual Property Office of the People's Republic of China Application Serial No. 201410201360.8, Office Action dated Nov. 25, 2015, 9 pages.
European Patent Office Application Serial No. 14161921.3, Search Report dated Sep. 10, 2015, 6 pages.

* cited by examiner

*Primary Examiner* — Thienvu Tran
*Assistant Examiner* — Tien Mai
(74) *Attorney, Agent, or Firm* — Lee, Hong, Degerman, Kang & Waimey

(57) ABSTRACT

An electric charging apparatus and a failure determination method therefor are provided. In the electric charging apparatus, a relay allows a current to flow inside the electric charging apparatus by switching of a switch. An acceleration sensor detects a vibration of the relay and generating an acceleration sensing signal. A control unit receives the acceleration sensing signal from the acceleration sensor and detects failure of the electric charging apparatus.

12 Claims, 2 Drawing Sheets

ELECTRIC CHARGING APPARATUS AND FAILURE DETERMINATION METHOD THEREFOR

CROSS-REFERENCE TO RELATED APPLICATIONS

Pursuant to 35 U.S.C. §119(a), this application claims the benefit of earlier filing date and right of priority to Korean Application No. 10-2013-0053862, filed on May 13, 2013, the contents of which is incorporated by reference herein in its entirety.

BACKGROUND

The present disclosure relates to an electric charging apparatus and a failure determination method therefor, and more particularly, to an electric charging apparatus for a vehicle which detects a vibration of a relay to generate an acceleration sensing signal and receives the acceleration sensing signal to detect a failure in the electric charging apparatus, and a failure determination method therefor.

As global environmental pollution is worsening, use of non-polluting energy is getting more important. Especially, air pollution problems in a metropolitan area are worsening day by day, and an exhaust gas is one of the main causes of them. Under such a situation, recently researches are being actively performed on commercializing a so-called electric vehicle using the electricity, which is nonpolluting energy, as a power source. The electric vehicle receives electric energy from the outside and charges a battery with it, and then uses a voltage charged in the battery to obtain power, which is mechanical energy, through a motor combined with wheels. That is, since the motor is driven by the voltage charged in the battery, the electric vehicle uses a large capacity rechargeable battery and includes an electric charging apparatus for charging the large capacity rechargeable battery.

An electric charging apparatus is divided into a rapid charger and a slow charger. The rapid charger is installed at a place for rapidly charging a battery during driving like a gas station. Charging time thereof takes about 20 min. On the contrary, the slow charger is installed at a place, such as a parking lot or a shopping mall, where long time parking is expected. Charging time thereof takes about 5 hours.

Such an electric charging apparatus includes a relay, and failures may occur in the relay such that the relay may be fused due to overcurrent or other causes during charging a charging target device.

However, it is difficult that a typical electric charging apparatus may detect such failures.

SUMMARY

Embodiments provide an electric charging apparatus and a failure determination method therefor which can easily find failures in the electric charging apparatus.

In one embodiment, an electric charging apparatus includes: a relay allowing a current to flow inside the electric charging apparatus by switching of a switch; an acceleration sensor detecting a vibration of the relay and generating an acceleration sensing signal; and a control unit analyzing a waveform of the acceleration sensing signal from the acceleration sensor and detecting failure of the electric charging apparatus, wherein the waveform of the acceleration sensing signal sequentially comprises a small vibration period, a large vibration period while a state of the switch is changed, and the control unit detects failure of the electric charging apparatus based on at least any one factor of a peak value in the small vibration period, a peak value in the large vibration period, and a time taken from the peak value in the small vibration period to the peak value in the large vibration period.

In further another embodiment, a failure determination method for an electric charging apparatus, includes: flowing a current inside the electric charging apparatus by switching of a switch included in a relay; detecting, by an acceleration sensor, a vibration of the relay and generating an acceleration sensing signal; and analyzing a waveform of the acceleration sensing signal from the acceleration sensor and detecting failure in the electric charging apparatus, wherein the waveform of the acceleration sensing signal sequentially comprises a small vibration period, a large vibration period while a state of the switch is changed, and the detecting of the failure comprises detecting the failure of the electric charging apparatus based on at least any one factor of a peak value in the small vibration period, a peak value in the large vibration period, and a time taken from the peak value in the small vibration period to the peak value in the large vibration period.

The acceleration sensor may be attached to the relay and detects the vibration of the relay.

The failure determination method may further include storing normal ranges of the waveform factors in a memory when the relay operates normally.

The detecting of the failure may include comparing at least any one factor of a current peak value in the small vibration period, a current peak value of the large vibration period in the large vibration period, and a current time taken from the peak value in the small vibration period to the peak value in the large vibration period with a corresponding normal range and detecting the failure of the electric charging apparatus when the factor is out of the normal range.

The normal range may be at least any one of a normal range of a peak value in the small vibration period, a normal range of a peak value in the large vibration period, and a normal range of a time taken from the peak value in the small vibration period to the peak value in the large vibration period.

The failure determination method may further include, when the failure in the electric charging apparatus is detected, notifying a user of the failure or stopping charging the electric charging apparatus.

The details of one or more embodiments are set forth in the accompanying drawings and the description below. Other features will be apparent from the description and drawings, and from the claims.

DETAILED DESCRIPTION OF THE EMBODIMENTS

Figure 1:
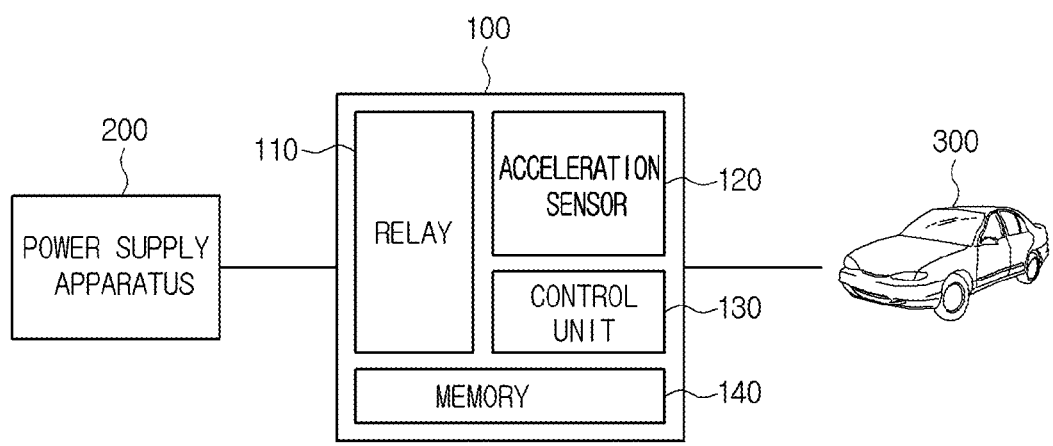
FIG. 1 is a block diagram illustrating a battery charging apparatus in charging a vehicle according to an embodiment.

Reference will now be made in detail to the embodiments of the present disclosure, examples of which are illustrated in the accompanying drawings. In the specification, descriptions or drawings on portions irrelative to the present invention will be omitted, or briefly described or drawn. Like reference numerals refer to like elements throughout.

It will be further understood that the terms "comprises" and/or "comprising" used herein specify the presence of stated features or components, but do not preclude the presence or addition of one or more other features or components.

It will be understood that when a part is referred to as being "connected" to another part, it can be "directly connected" to the other part or "electrically connected" to the other part with an intervening layer present between them.

In the following description, usage of suffixes such as 'module' or 'unit' used for referring to elements is given merely to facilitate explanation of the present invention, without having any significant meaning by itself.

An electric charging apparatus and an operation method therefor according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

FIG. 1 is a block diagram illustrating an electric charging apparatus in charging a vehicle according to an embodiment.

The electric charging apparatus according to the embodiment is described in relation to FIG. 1.

The electric charging apparatus 100 according to an embodiment may include a relay 110, an acceleration sensor 120, a control unit 130 and a memory 140. However, the elements shown in FIG. 1 are not necessities and the electric charging apparatus 100 may be implemented with more other elements or fewer elements.

The electric charging apparatus 100 receives a power supply voltage from a power supply apparatus 200 and charges an electric vehicle 300. The electric vehicle 300 is exemplified herein, but the present invention is not limited thereto and the electric vehicle 300 may be replaced with an electrically rechargeable device.

Figure 2:
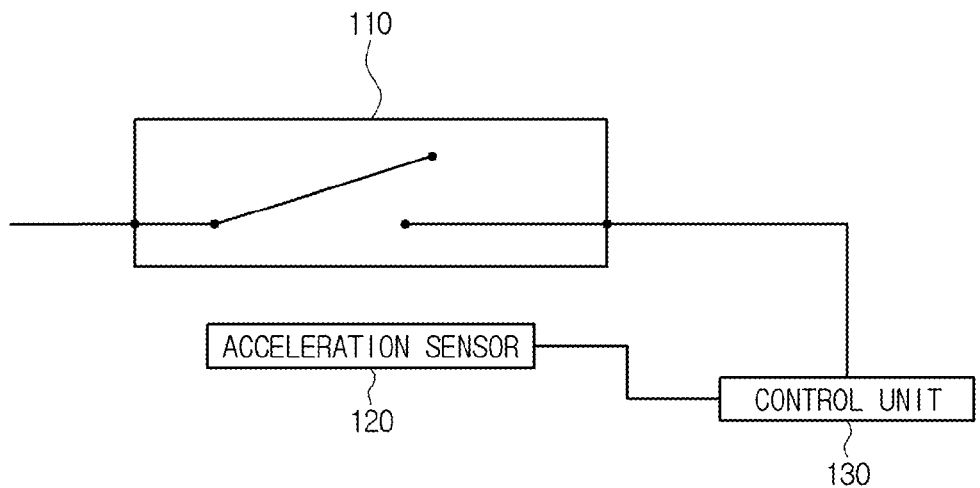
FIG. 2 is a view simply illustrating a relay, an acceleration sensor, and a control unit according to an embodiment.

FIG. 2 is a view simply illustrating a relay, an acceleration sensor, and a control unit according to an embodiment.

The relay, the acceleration sensor, and the control unit according to an embodiment are described in relation to FIG. 2.

The relay 110 receives a relay state changing control signal from the control unit 130 and controls a current flowing through the electric charging apparatus 100.

As shown in FIG. 2, the relay 110 may include one or more switches. When a value of the relay state changing control signal corresponds to a relay on, the relay 100 may turn on the switch. When the value of the relay state changing control signal corresponds to a relay off, the relay 100 may turn off the switch.

A dynamic force component, such as an acceleration of, a vibration of, or a shock on an object may be measured by processing an output signal of the acceleration sensor 120. Since specifically sensing a moving state of the object, the acceleration sensor 120 is used for various transportation means, such as a vehicle, a train, a vessel, or an airplane, and a robot. The acceleration sensor 120 may sense a vibration of the relay 110 according to a state change of the switch of the relay 110. The acceleration sensor 120 senses the vibration of the relay 110 to generate an acceleration sensing signal.

The control unit 130 controls an entire operation of the electric charging apparatus 100. The control unit 130 receives the acceleration sensing signal of the acceleration sensor 120 to diagnose failures in the electric charging apparatus 100.

The control unit 120 according to an embodiment controls a state change of the switch of the relay. Here, the state change of the switch may represent a change from a turned-on state into a turned-off state or from a turned-off state into a turned-on state.

The acceleration sensor 120 according to an embodiment may be attached to a bottom end of the relay 100 and sense the vibration of the relay 110. However, a position of the acceleration sensor 120 is not limited thereto and may be positioned at a part at which the vibration of the relay 100 may be sensed.

A method of diagnosing, by the control unit 130, failures in the electric charging apparatus 100 is as follows. The control unit 130 may analyze a waveform of the acceleration sensing signal from the acceleration sensor 120 and diagnose failures in the electric charging apparatus 100.

Figure 3:
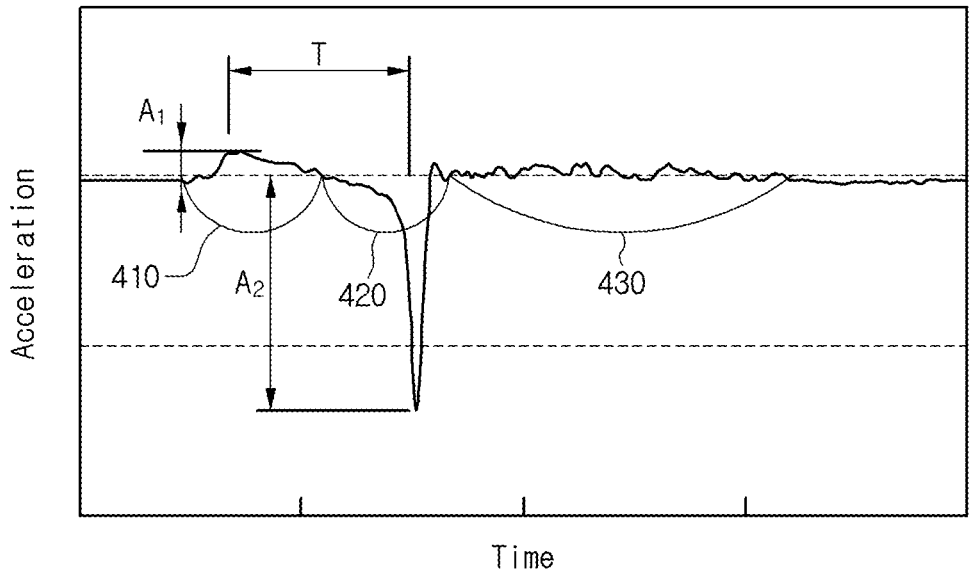
FIG. 3 is a waveform diagram representing a vibration of a relay as a waveform according to an embodiment.

FIG. 3 is a waveform diagram of the acceleration sensing signal according to the vibration of the relay according to an embodiment.

Referring to FIG. 3, a waveform of an acceleration sensing signal according to the vibration of the relay 110 according to the switch on/off is described.

The waveform of an acceleration sensing signal according to a vibration of the relay 110 sequentially includes three vibration periods of a small vibration period 410, a large vibration period 420, and a fine vibration period 430.

The small vibration period 410 occurs rightly before a switch state of the relay 110 is changed. In the small vibration period 410, the switch of the relay 110 moves for a state change according to a pulse signal from the control unit 130. Due to this moving operation, the relay 110 vibrates in small amplitude.

The large vibration period 420 occurs at a moment that the state of the switch of the relay 110 is changed. The switch of the relay 110 in the large vibration period 410 switches from an ON state into an OFF state or from an OFF state into an ON state. At this time, a physical force occurs according to a movement of the switch and, due to this force, the relay 100 vibrates larger than in the small vibration period 410.

The fine vibration period 430 occurs after the state of the switch of the relay 110 is changed. In the fine vibration period 430, the relay 110 finely vibrates due to the physical force occurred in the large vibration period 420.

The control unit 130 may detect a peak value A1 in the small vibration period 410, a peak value A2 in the large vibration period 420, or a time T taken from the peak value A1 in the small vibration period 410 to the peak value A2 in the large vibration period 420.

The control unit 130 may compare current values of A1, A2, and T with normal ranges of A1, A2, and T. The normal range may represent ranges of A1, A2, and T when the electric charging device 100 normally operates, and be stored in the memory 140. According to the comparison result, when even any one value of the detected A1, A2, and T is out of the normal range, the control unit 130 may detect occurrence of failure of the relay 110. When the failure, for example, fusing of the switch of the relay 110 occurs due to overcurrent or other causes, the magnitude of A1 or A2 may be decreased or increased. In addition, the value of T may be decreased or increased.

According to an embodiment, the memory 140 may store the peak value A1 in the small vibration period 410, the peak value A2 of the large vibration period 420, and a value of time T taken from the peak value A1 in the small vibration period 410 to the peak value A2 in the large vibration period 420.

When detecting occurrence of failure of the relay 110, the control unit 130 may stop operation of the electric charging apparatus 100 or notifying a user of the failure occurrence.

According to an embodiment, the control unit 130 may respectively compare current values of A1, A2, and T with normal ranges stored in the memory 140.

Referring to FIG. 1 again, the electric charging apparatus is described.

The memory 140 may store a program for operation of the control unit 130 and temporarily store input/output data.

The memory 140 may include at least one recording medium of a flash memory type, hard disk type, multimedia card micro type, or card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, or an optical disk.

The memory 140 may store various numerical values according to an embodiment.

Figure 4:
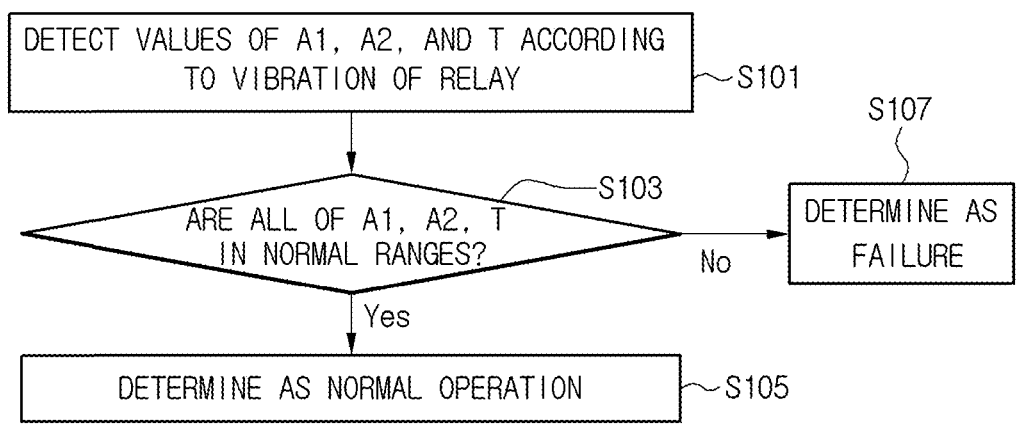
FIG. 4 is a flow chart illustrating a failure determination method for an electric charging apparatus according to an embodiment.

FIG. 4 is a flowchart illustrating a failure determination method for an electric charging apparatus.

Referring to FIG. 4, the failure determination method for the electric charging apparatus is described.

The control unit 130 detects values of A1, A2, and T according to the vibration of the relay (operation S101).

The control unit 130 compares the detected A1, A2, and T values with each normal range, respectively (operation S103).

When the A1, A2, and T values are all in the normal ranges respectively, the control unit 130 determines that the electric charging apparatus 100 operates normally (operation S105).

When the A1, A2, and T values are not in the normal ranges respectively, the control unit 130 determines that the electric charging apparatus 100 is in failure (operation S107).

The above-described configuration and method of the above-described embodiments are not limitedly applied to the electric charging apparatus 100. All of or a part of embodiments are selectively combined and configured to enable various modifications to be performed.

According to an embodiment, failures in an electric charging apparatus can be easily detected.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric charging apparatus comprising:
a relay allowing a current to flow inside the electric charging apparatus by switching of a switch in the relay;
an acceleration sensor detecting a vibration of the relay and generating an acceleration sensing signal; and
a control unit analyzing a waveform of the acceleration sensing signal from the acceleration sensor and detecting failure of the electric charging apparatus,
wherein the waveform of the acceleration sensing signal sequentially comprises a small vibration period, a large vibration period while a state of the switch is changed, and
the control unit detects failure of the electric charging apparatus based on a time duration between a peak value in the small vibration period and a peak value in the large vibration period.

2. The electric charging apparatus according to claim 1, wherein the acceleration sensor is attached to the relay and detects the vibration of the relay.

3. The electric charging apparatus according to claim 1, further comprising a memory storing normal ranges of the factors of the waveform when the relay operates normally.

4. The electric charging apparatus according to claim 3, wherein the control unit compares at least any one factor of a current peak value in the small vibration period, a current peak value in the large vibration period, and a current time taken from the peak value in the small vibration period to the peak value in the large vibration period with a corresponding normal range and detects the failure of the electric charging apparatus when the factor is out of the normal range.

5. The electric charging apparatus according to claim 4, wherein the normal range is at least any one of a normal range of a peak value in the small vibration period, a normal range of a peak value in the large vibration period, and a normal range of a time taken from the peak value in the small vibration period to the peak value in the large vibration period.

6. The electric charging apparatus according to claim 1, wherein, when detecting the failure in the electric charging apparatus, the control unit notifies a user of the failure or stops charging the electric charging apparatus.

7. A failure determination method for an electric charging apparatus, comprising:
flowing a current inside the electric charging apparatus by switching of a switch included in a relay;
detecting, by an acceleration sensor, a vibration of the relay and generating an acceleration sensing signal; and
analyzing a waveform of the acceleration sensing signal from the acceleration sensor and detecting failure in the electric charging apparatus,
wherein the waveform of the acceleration sensing signal sequentially comprises a small vibration period, a large vibration period while a state of the switch is changed, and
the detecting of the failure comprises detecting the failure of the electric charging apparatus based on a time duration between a peak value in the small vibration period and a peak value in the large vibration period.

8. The failure determination method according to claim 7, wherein the acceleration sensor is attached to the relay and detects the vibration of the relay.

9. The failure determination method according to claim 7, further comprising storing normal ranges of the waveform factors in a memory when the relay operates normally.

10. The failure determination method according to claim 9, wherein the detecting of the failure comprises comparing at least any one factor of a current peak value in the small vibration period, a current peak value of the large vibration period in the large vibration period, and a current time taken from the peak value in the small vibration period to the peak value in the large vibration period with a corresponding normal range and detecting the failure of the electric charging apparatus when the factor is out of the normal range.

11. The failure determination method according to claim 10, wherein the normal range is at least any one of a normal range of a peak value in the small vibration period, a normal range of a peak value in the large vibration period, and a normal range of a time taken from the peak value in the small vibration period to the peak value in the large vibration period.

12. The failure determination method according to claim 7, further comprising, when the failure in the electric charging apparatus is detected, notifying a user of the failure or stopping charging the electric charging apparatus.

* * * * *